United States Patent [19]

Griffin et al.

[11] Patent Number: 5,521,013

[45] Date of Patent: May 28, 1996

[54] PARTIALLY-FLUORINATED POLYMERS

[75] Inventors: Anselm C. Griffin, Hattiesburg, Miss.; Ladislav M. Wilson, Cambridge, Great Britain

[73] Assignee: Minnesota Mining and Manufacturing Company, St. Paul, Minn.

[21] Appl. No.: 411,754

[22] Filed: May 16, 1995

[30] Foreign Application Priority Data

Oct. 6, 1992 [GB] United Kingdom ............ 9220941

[51] Int. Cl.⁶ ........................... B32B 27/36
[52] U.S. Cl. ............ 428/480; 528/272; 528/288; 528/290; 528/291; 528/293; 528/308; 528/367; 528/373; 528/401; 428/480
[58] Field of Search .................... 528/272, 288, 528/290, 291, 293, 308, 367, 373, 401; 428/480

[56] References Cited

U.S. PATENT DOCUMENTS

| 4,250,300 | 2/1981 | Saegusa et al. | 528/401 |
| 5,233,058 | 8/1993 | Anton et al. | 549/450 |
| 5,286,825 | 2/1994 | Anton et al. | 526/247 |

FOREIGN PATENT DOCUMENTS

| 263369 | 7/1968 | Austria . |
| 352718 | 1/1990 | European Pat. Off. . |
| 0352718 | 1/1990 | European Pat. Off. . |

*Primary Examiner*—Samuel A. Acquah
*Attorney, Agent, or Firm*—Douglas B. Little; Gary L. Griswold; Walter N. Kirn

[57] ABSTRACT

Partially fluorinated polymer comprising a backbone and side-chains, in which the backbone and side-chains are each 4 atoms long and are chemically incompatible, one chain being at least predominantly hydrocarbon and the other comprising a $C_{4+}$ perfluorocarbon moiety.

12 Claims, No Drawings

PARTIALLY-FLUORINATED POLYMERS

This invention relates to partially-fluorinated polymers that have chemically-incompatible segments; the polymers have interesting and varied properties, including liquid crystallinity.

An example of a molecule having two distinct parts that are mutually-immiscible is $C_{10}H_{21}$—$C_{10}F_{21}$, i.e. (perfluorodecyl)decane, as described by Twieg, Robolt J. Polym. Sci. Polym. Phys. Ed. 21:901(83), and Mahler, Guillon and Skoulios, Mol. Cryst. Liq. Cryst. 2:111–119 (1985). That compound was prepared by the reaction of perfluorodecyl iodide with 1-decene, followed by reduction; the amphiphilic product exhibited a smectic B liquid crystalline phase.

Höpken et al, "Integration of Fundamental Polymer Science Technology—5", ed. Lemstra and Kleintjes, Elsevier Applied Sciences, describe amphiphilic allyl ethers and methacrylates. Alcohols of the formula $F(CF_2)_n(CH_2)_mOH$, wherein n=8, 10, 12 and m=4, 6, 10, were converted to allyl ethers, and sequentially perfluorinated methacrylates were then prepared. The polymers exhibit a mesomorphic "Schlieren" texture.

Budovskaya et al, Polymer Science USSR 32 (3):502–506 (1990), disclose comb-like polyfluoroalkyl (meth)acrylates having side-chains of the formula=$COOCH_2(CF_2)_nH$, wherein n=2, 4, 6, 8, 10, 12; the backbone comprises a single —$CH_2$— group between the carbonate and the CH or $CCH_3$ group to which the side-chains are bonded. The polymers are mesomorphic in structure, with a degree of ordering directly related to n; for n=10, the formation of a liquid crystal state "is proved by an optical method".

EP-A-0352718 discloses partially-fluorinated polymers in which repeating units include a sequence of the formula

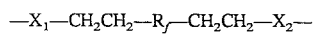

wherein $X_1$ and $X_2$ are polymer-forming linkages (e.g. COO or OOC for polyesters, CONH or NHCO for polyamides) and $R_f$ is a $C_{1-40}$ perfluorinated divalent organic radical. Such polymers are prepared from dinitriles or ester-nitriles. The polymers are apparently those sold under the registered Trade Mark "Zonyl" as fluoro-surfactants that offer thermal and chemical stability superior to that of hydrocarbon surfactants. The polymers are also suitable for use as non-stick coatings.

Surprisingly, it has now been found that polymers having chemically-incompatible segments can be produced that clearly have liquid crystalline properties, as well as offering the properties associated with the polymers described above. The repeating units (of which there may be any number, preferably at least 3, e.g. 3 to 30) of the novel polymers include a side-chain and, between the atom or group to which the side-chain is bonded, a backbone chain: the chains are each at least 4 atoms long and are chemically-incompatible, one chain being at least predominantly hydrocarbon and other comprising a $C_{4+}$ perfluorocarbon group. Depending on which of the chains comprises the hydrocarbon and perfluorocarbon groups, representative formulae of repeating units of polymers according to the present invention are

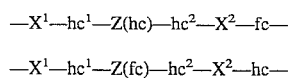

wherein $X^1$ and $X^2$ are as defined above; Z is the atom or group to which the side-chain is bonded; fc is the perfluorocarbon; and hc, $hc^1$ and $hc^2$ are each hydrocarbon (hc may also be replaced by a perfluorocarbon group $fc^1$ that is the same or different from fc).

The atom or group to which the side-chain is bonded, i.e. Z in the formulae given above, may be —CH(—)— or —CH($CH_2$—)—, but is preferably —N($SO_2$—)—; the bracketed hyphen indicates attachment of the side-chain. The preference for —N($SO_2$—)— reflects a preferred process for introducing the side-chain into one of the monomers from which a polymer may be prepared. Thus, for example, the compound $fcSO_2F$ is reacted with a compound of the formula

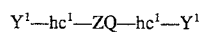

wherein Q is a reactive group and $Y^1$ is a group reactive with another group $Y^2$ to form $X^1$ or $X^2$ in the ultimate polymer. $Y^1$ is a substituent such as I or OH, or within $hc^1$ or $hc^2$, e.g. a C=C bond. In this case, when the side-chain comprises the perfluorocarbon group, the relevant monomer can be synthesised without forming a carbon—carbon bond and without the expense of obtaining or synthesising the appropriate perfluoroalkyl iodide (fcI).

Although the monomers and polymers to which this invention relates may be prepared by procedures that will be readily apparent to those skilled in the art, polyesters of the invention may be prepared by the Stupp method of ester formation, following Moore et al, Macromolecules 23:55–70 (1990). This procedure, and the invention as a whole, are illustrated in the following Examples. The reaction scheme is shown in the Chart headed "Fluorinated Side-chain Polyesters".

EXAMPLES 1 TO 10

In each case, the compound shown in the Chart as "$F_8$" and "C1" in the following table of properties was reacted with a different hydrocarbon dicarboxylic acid, to obtain the polymer enumerated as 2–11 in the tabulated data. More specifically, in each case, 0.587 g of "$F_8$" was stirred with a stoichiometric amount of the dried diacid in approx. 50 ml dry $CH_2Cl_2$ (all reagents were dried), and 0.19 g PTSA and 0.122 g DMAP were added together. Then 0.8–1.2 ml diisopropylcarbodiimide was added to the stirred solution under a positive stream of $N_2$.

PTSA=paratoluenesulphonic acid
DMAP=4-dimethylaminopyridine

After a few hours, a white precipitate formed. After 1 day, the product was precipitated by pouring the solution into a larger volume of methanol (approx. 150–200 ml), and the polymer was collected by filtration. The product was washed several times with methanol to remove PTSA/DMAP.

IR spectra show ester, —C—F and —C—H. Main peaks at approx. 1730, 1100–1250 and 2800–3000. H NMR shows N—$CH_2CH_2$—O at: one multiplet 4.30(2), 2 multiplets 3.85(1), 3.65(1) and aliphatic diester between 2.8 and 1.2 (aromatic at approx. 8.0 and 7.5). Yield: usually between 80–88% white solid. See table for details. All the polymers exhibited liquid crystalline properties.

| COMPOUND (Method) (Yield) Elem. analysis Calc Found | IR | SIDE-CHAIN NMR H (in CDCl₃ unless ethium stated) | NMR C | GPC | DSC (MP, °C.) | MICRS |
|---|---|---|---|---|---|---|
| C1 HO-Et-N-Et-OH<br>SO2<br>(CF2)8<br>F<br><br>(from 3M)<br>% H  1.70  1.64<br>% C 24.50 24.54<br>% N  2.39  2.43 | 3200–3400<br><br>1060–1290 br.s<br>1616, 1580. | in (CD3)2CO<br>4.35t(1)<br>3.83t(2)<br>3.75m(1)<br>3.64m(1) | | | (MP 113.5–115.5) | LC shows wave of batonets sweep across then grainy-thready texture. |
| 2 (OCH2CH2)2NSO2<br>—(CF2)8F<br>OCPhPhCO—)n<br><br>(Stupp)<br>(96%) | 1602, 841, 748<br><br>1716<br>1787<br><br>1060–1300br.s<br>1154, 1205<br><br>2985–2833<br>1450, 1388 | 8.03, 8.06 d2<br>7.54, 7.58 d2<br><br>4.62 m2<br>3.90 m2<br><br>(weak, low sol)<br>(Lo MW fract) | Insol (Lo MW fract, in CHCl3)<br><br>Mn > 3000<br>Mw > 10,000 | | 215, 253 H1<br>220, 257 H2<br>251, 165 C1<br>(255-7) | Has LC phase, fluid birefr. |
| 3 (O-Et-N-Et-O-<br>SO2<br>(CF2)8<br>F<br>—OCCH2CH2CO—)n<br><br>(Stupp)<br>(71%)<br><br>% H 1.79 1.90<br>% C 28.7 28.86<br>% N 2.09 2.26 | 3000–2850<br><br>1737 s<br>1650<br><br>1060–1290 br.s<br>1525, 1396, 1054, 983 | 4.42 m2<br>3.94 m1<br>3.74 m1<br><br>2.77 s2 | | sol<br>DP 12<br><br>Mn 7850<br>Mw 12000<br><br>D 1.52 | (Softng 92<br>MP 120–123)<br>75,133 H1<br>132, 136 H2<br>130, 132 C1 | LC Phase small thready texture. fluid when opaque. |
| 4 (O-Et-N-Et-O-<br>SO2<br>(CF2)8<br>F<br>—OC(CH2)3-CO—)n<br><br>(Stupp)<br>(81%) | 3000–2850<br><br>1737 s<br>1650<br><br>1060–1290 br.s<br>1525, 1396, 1054, 983 | 4.30 m2<br>3.84 m1<br>3.61 m1<br><br>2.41 s2<br>1.97 m1 | | DP 8<br><br>Mn 5400<br>Mw 8600<br><br>D 1.59 | (MP 111–113)<br>61,111 H1<br>110 H2<br>109 C1 | L.C fluid when opaque. Grainy texture |
| 5 (O-Et-N-Et-O-<br>SO2<br>(CF2)8<br>F<br>—OC(CH2)4—CO—)n<br><br>(Stupp)<br>(86%)<br>% H 2.29 2.26<br>% C 31 31.24<br>% N 2.01 1.94 | 3000–2850<br><br>1737 s<br>1650<br><br>1060–1290 br.s<br>983 | 4.28 t2<br>3.83 m1<br>3.62 m1<br><br>2.36 t2<br>1.65 m2 | | DP 23<br><br>Mn 15600<br>Mw 24300<br><br>D 1.56 | (MP 82–84)<br>66, 74.8, 81 H1<br>75.4 H2<br>73.5 C1 | L.C. Birefr. fluid. Grainy texture. |
| 6 (O-Et-N-Et-O-<br>SO2<br>(CF2)8<br>F<br>—OC(CH2)5—CO—)n<br><br>(Stupp)<br>(84%) | 3000–2850<br><br>1737 s<br>1650<br><br>1060–1290 br.s<br>1525, 1396, 1054, 983 | 4.28 t2<br>3.81 m1<br>3.64 m1<br><br>2.33 t2<br>1.64 m2<br>1.34 m1 | | | (Flexible glass at RT MP 60–65° C.) | V. little birefr. Has (faint) grainy texture. L.C fluid when opaque. |
| 7 (O-Et-N-Et-O-<br>SO2<br>(CF2)8<br>F<br>—OC(CH2)6—CO—)n<br><br>(Stupp)<br>(86%) | 3000–2850<br><br>1737 s<br>1650<br><br>1060–1290 br.s<br>1525, 1396, 1054, 983 | 4.30 t2<br>3.81 m1<br>3.65 m1<br><br>2.32 t2<br>1.58 m2<br>1.32 m2 | | | (MP 70–72) | A little birefr. Has (faint) grainy texture. L.C fluid when opaque. |

-continued

| | | | | | | |
|---|---|---|---|---|---|---|
| 8 | (O-Et-N-Et-O-SO2 (CF2)8 F —OC(CH2)8—CO—)n (Stupp) (86%) | 3000–2850 1737 s 1650 1060–1290 br.s 1525, 1396, 1054, 983 | 4.31 t2 3.84 m1 3.65 m1 2.35 t2 1.62 m2 1.32 m4 | | (Softn 87 MP 130–132) | A little birefr. Has (faint) grainy texture. L.C fluid when opaque. |
| 9 | (O-Et-N-Et-O-SO2 (CF2)8 F OC(CH2)12—CO—)n (Stupp) (86%) % H 3.95 4.01 % C 38.6 38.52 % N 1.73 1.70 | 3000–2850 1737 s 1650 1060–1290 br.s 1525, 1396, 1054, 983 | 4.26 t2 3.85 m1 3.66 m1 2.33 t2 1.61 m2 1.25 m8 | | (Softn 92 MP 139–141) | A little birefr. Has (faint) grainy texture. L.C fluid when opaque. |
| 10 | (O-Et-N-Et-O-SO2 (CF2)8 F OC(CH2)20—CO—)n (Stupp) (88%) | 3000–2850 1737 s 1650 1060–1290 br.s 1525, 1396, 1054, 983 | 4.28 t2 3.83 m1 3.64 m1 2.31 t2 1.60 m2 1.23 m16 | | (Softn 107 MP 129–131) | A little birefr. L.C fluid when opaque. Has grainy texture also a second phase. 'needles' -due to hydro-carbon. |
| 11 | (—CH2CHCO2—)n (CH2)6-OPhCO2— (CH2)10(CF2)12F (Stupp) (64%) | 1604, 1509, 840 1730, 1716 1260 1100–1280 br.s 1110, 1150, 1210 | Insol | Insol | (No MP Decomp. >282) | |

FLUORINATED SIDE-CHAIN POLYESTERS

REACTIONS;

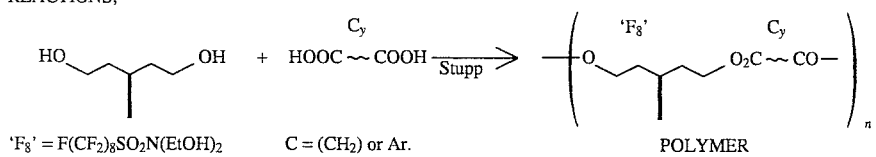

'F$_8$' = F(CF$_2$)$_8$SO$_2$N(EtOH)$_2$    C = (CH$_2$) or Ar.    POLYMER

EXAMPLES

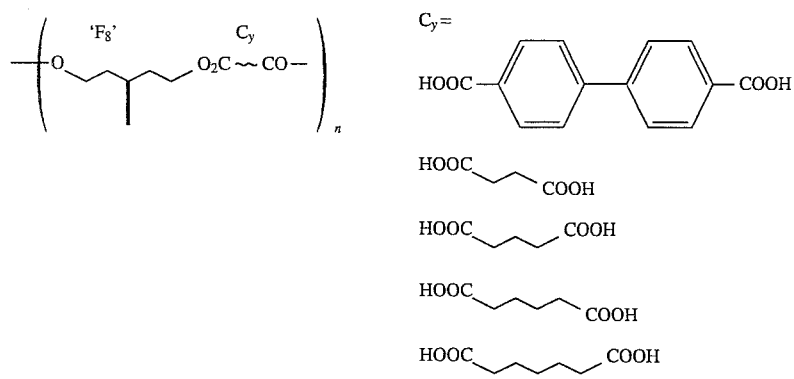

-continued
FLUORINATED SIDE-CHAIN POLYESTERS

ALL SHOW L.C. PHASE.

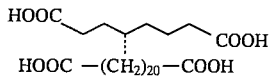

$HOOC-(CH_2)_{20}-COOH$ and

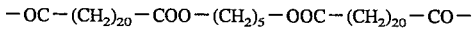

We claim:

1. A polymer whose repeating units include a side-chain and, between the atoms or group to which the side-chain is bonded, a backbone chain, in which said backbone and side chains are each at least four atoms long and are chemically incompatible, one chain being at least predominantly hydrocarbon and the other comprising a $C_{4+}$ perfluorocarbon group.

2. A polymer according to claim 1, wherein the repeating units have the formula

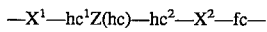

wherein $X^1$ and $X^2$ are absent or are polymer-forming linkages; Z is the atom or group to which the side-chain is bonded; fc is the perfluorocarbon; and hc, $hc^1$ and $hc^2$ are each hydrocarbon.

3. A polymer according to claim 1, wherein the side-chain is the perfluorocarbon group.

4. A polymer according to claim 3, wherein the repeating units have the formula

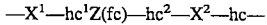

wherein $X^1$, $X^2$ are absent or are polymer forming linkages, Z is the atom or group to which the side chain is bonded, fc is the perfluorocarbon group, hc, $hc^1$ and $hc^2$ are each hydrocarbon moieties of which hc may be replaced by another perfluorocarbon $fc^1$.

5. A polymer according to claim 4, wherein $hc^1$ and $hc^2$ are each $-(CH_2)_{1-2}-$.

6. A polymer according to claim 4, wherein Z is selected from the group consisting of $-N-(SO_2-)-$, $-CH(-)-$ and $-CH(CH_2-)-$, the bracketed hyphen indicating attachment of the side-chain.

7. A polymer according to claim 1, which is a polyester.

8. A polymer according to claim 1, wherein the perfluorocarbon group has 6 to 20 C atoms.

9. A polymer according to claim 1, wherein either the backbone or side chain includes a hydrocarbon unit of 6 to 20 C atoms.

10. A polymer according to claim 1, which has liquid crystalline properties.

11. A substrate coated with a polymer according to claim 1.

12. A process for preparing a partially fluorinated polymer which comprises reacting together corresponding compounds of the formulae

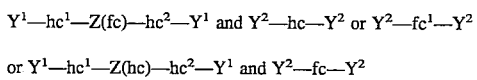

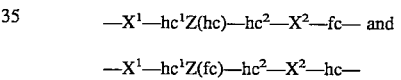

wherein $Y^1$ and $Y^2$ are mutually-reactive functional groups, on or within the hc or fc to which they are shown attached, that together form $X^1$ and $X^2$ in a polymer having one of the following formulas:

$-X^1-hc^1Z(hc)-hc^2-X^2-fc-$ and $-X^1-hc^1Z(fc)-hc^2-X^2-hc-$ in which $X^1$ and $X^2$ are selected from the group of polymer forming linkages consisting of COO, OOC, CONH, and NHCO, Z is selected from the group consisting of $-N-(SO_2-)-$; $-CH(-)-$ and $-CH(CH_2-)-$; fc is a perfluorocarbon moiety having at least 4 carbon atoms; hc, $hc^1$ and $hc^2$ are hydrocarbon moieties.

* * * * *

UNITED STATES PATENT AND TRADEMARK OFFICE
CERTIFICATE OF CORRECTION

PATENT NO.: 5,521,013

DATED: May 28, 1996

INVENTOR(S): Anselm C. Griffin, Ladislav M. Wilson

It is certified that error appears in the above-identified patent and that said Letters Patent is hereby corrected as shown below:

Column 3, entry for polymer No. 5 (second table column)
   "1060-1290 br.s
     983"          should be -- 1060-1290 br.s
     1525, 1396, 1054
     983 --

Column 5 formula

The formula "$F_8$" should be above the formula; 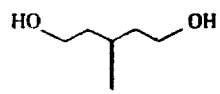

Signed and Sealed this

Nineteenth Day of August, 1997

*Attest:*

BRUCE LEHMAN

*Attesting Officer*      Commissioner of Patents and Trademarks